US006345799B1

United States Patent
Fusi

(10) Patent No.: US 6,345,799 B1
(45) Date of Patent: Feb. 12, 2002

(54) DEVICE FOR SUSPENDING LOADS, SPECIALLY FOR LIGHTING EQUIPMENT FOR PHOTOGRAPHIC OR TELEVISION STUDIOS

(75) Inventor: Giuliano Fusi, Florence (IT)

(73) Assignee: Industria Fototecnica Firenze S.r.l. (IT)

( * ) Notice: Subject to any disclaimer, the term of this patent is extended or adjusted under 35 U.S.C. 154(b) by 0 days.

(21) Appl. No.: 09/546,650

(22) Filed: Apr. 10, 2000

(30) Foreign Application Priority Data

Apr. 16, 1999 (IT) .......................................... FI990042 U

(51) Int. Cl.[7] .................................................. A47H 1/10
(52) U.S. Cl. ..................... 248/320; 248/277.1; 248/327
(58) Field of Search ................................. 248/320, 327, 248/343, 298.1, 277.1, 614, 610; 254/273, 272, 295, 294; 362/403

(56) References Cited

U.S. PATENT DOCUMENTS

| | | | | |
|---|---|---|---|---|
| 3,623,707 A | * | 11/1971 | Klopp | .......................... 254/22 |
| 4,749,169 A | * | 6/1988 | Pickles | ......................... 254/122 |
| 5,261,645 A | * | 11/1993 | Huffman | ...................... 254/267 |
| 5,366,203 A | * | 11/1994 | Huffman | ...................... 254/362 |
| 5,379,977 A | * | 1/1995 | Rönn et al. | .............. 248/277.1 |
| 5,582,378 A | * | 12/1996 | Fusi | ......................... 248/277.1 |
| 5,725,069 A | * | 3/1998 | Sullivan | ...................... 182/157 |

\* cited by examiner

Primary Examiner—Ramon O. Ramirez
Assistant Examiner—Holly N. Sy
(74) Attorney, Agent, or Firm—McGlew and Tuttle, P.C.

(57) ABSTRACT

A device for suspending loads includes an adjusting device (1) to permit the position of loads to be adjusted for height and a structure (9, 11) of articulated bars which can be extended as a double pantograph. Connectors to the overlying structure and a connection to the suspended loads are provided. Combined horizontal (17A, 1713; 17C, 17D) and vertical (28; 30) guides fixed to the connection means (12, 14). Corresponding pairs of terminal bars in the structure of articulated bars slide in the combined horizontal (17A, 1713; 17C, 17D) and vertical (28; 30) guides.

8 Claims, 4 Drawing Sheets

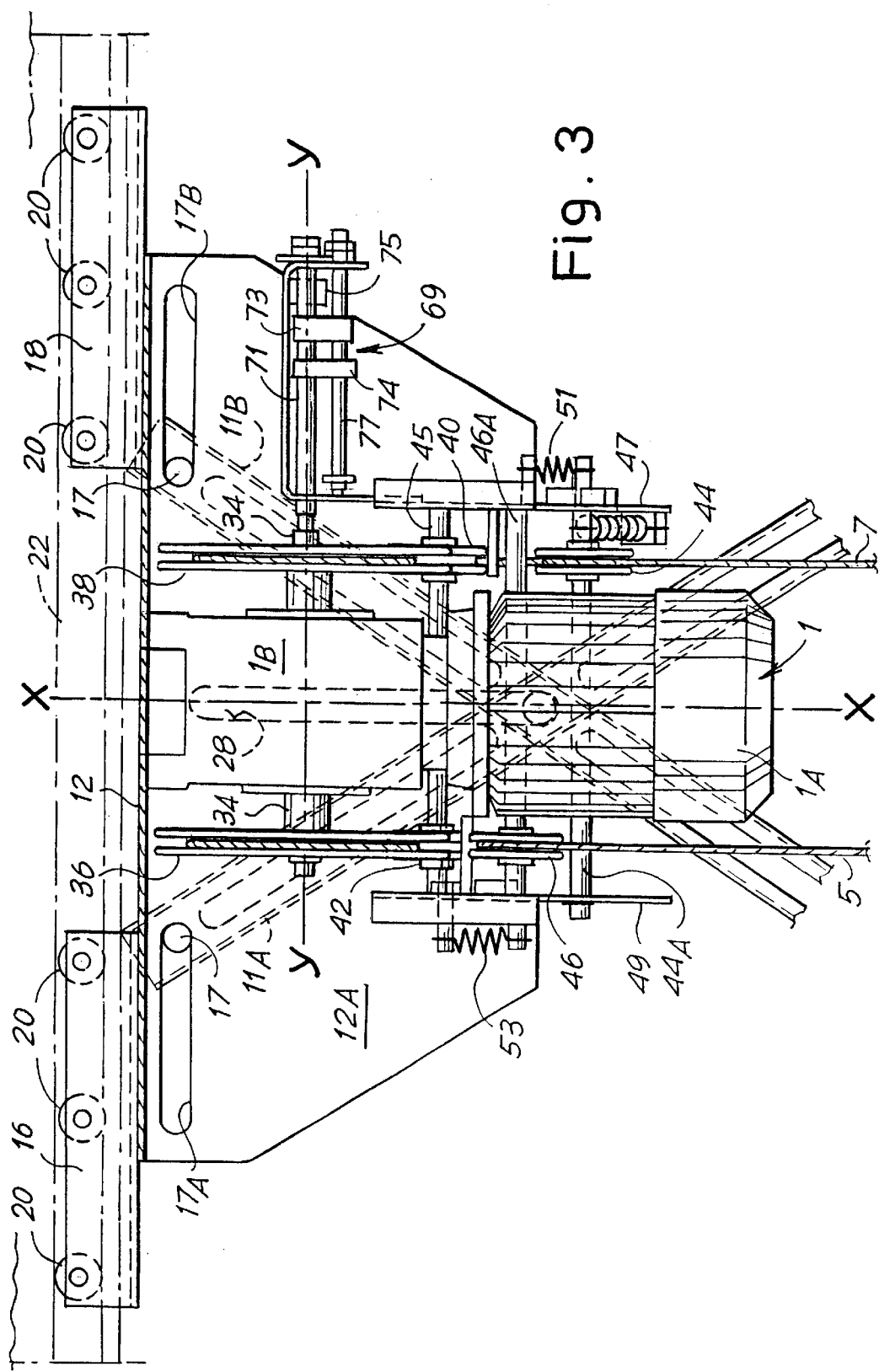

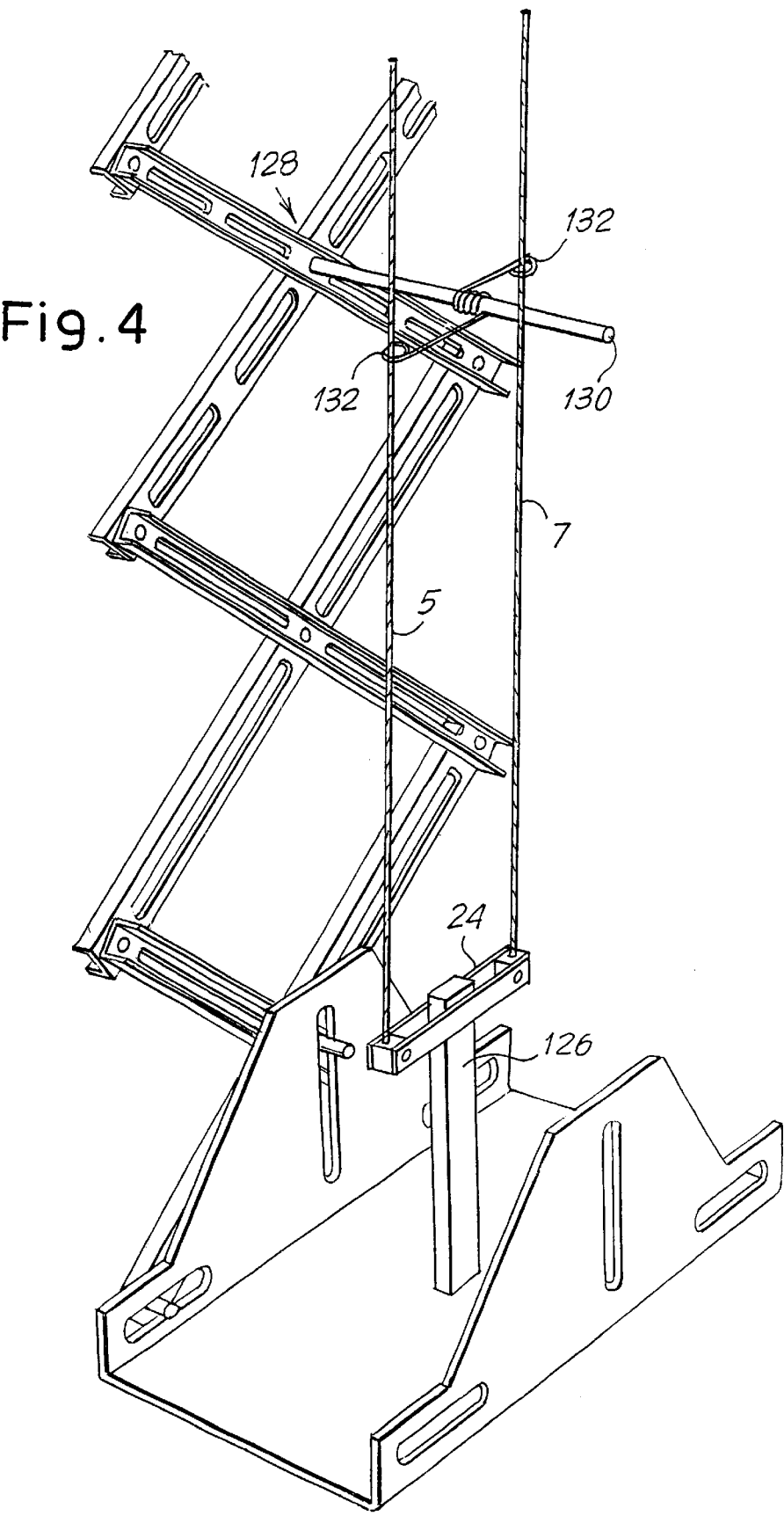

DEVICE FOR SUSPENDING LOADS, SPECIALLY FOR LIGHTING EQUIPMENT FOR PHOTOGRAPHIC OR TELEVISION STUDIOS

FIELD OF THE INVENTION

This invention relates to a device for suspending loads from an overlying structure, such as a ceiling or the like, in particular for lighting equipment for theaters, photographic, cinema or television studios, studios in which the trafficked surface located below the suspended equipment is used by performers and supporting staff.

BACKGROUND OF THE INVENTION

The known devices, which comply with rigorous safety standards in order to prevent accidents, in particular arising from the fall of suspended loads (or a suspended load), comprise (see for example that described in Italian Utility Model application no. FI/93/U/109 lodged on the Jun. 10, 1993) a double pantograph structure and cable means to adjust the height of the load above the trafficked surface. Normally such pantograph structure terminates at the two ends in a corresponding pair of bars of appreciably shorter length in comparison with the other bars in the pantograph structure. For example the length of these terminal bars is less than one third that of the other bars, so that both the ends of such pantograph structure terminate in corresponding extension parallelograms which are appreciably reduced in size, the distal apex of which is pivoted to the overlying structure and the suspended load respectively. The apex opposite the distal apex of each of the terminal parallelograms can slide in, a corresponding vertical guide which is rigidly connected to both the overlying structure and the suspended load. In this way the system has limited rigidity in respect of transverse oscillations because of the play in the couplings between the bars in the terminal parallelograms in the vertical guides, play whose effect is amplified by the small size of the terminal bars. For these reasons known devices only permit the application of axial loads, e.g. a single lighting device whose center of gravity is vertically in line with the vertical axis of symmetry of the pantograph structure. To suspend several lighting devices as a whole without being concerned with this vertical alignment of the center of gravity of the whole, more complex and costly suspension devices (known as "hoists") are instead used.

Furthermore, in known devices these pantograph structures are generally suspended below a lifting winch, which may be motor-driven, which pays out/reels in suspension cables. Because of the size of the winch this fact limits the amount by which the suspended load can be moved upwards.

SUMMARY AND OBJECTS OF THE INVENTION

The purpose of this invention is to avoid these disadvantages and in particular to provide a low cost device which will also suspend eccentric loads. The invention relates to a device comprising cable lifting means for adjusting the position of loads for height and an elongatable double pantograph structure; means for attaching the device to the overlying structure and means for attaching the device to the suspended loads are provided at the opposite ends of the double pantograph structure. According to the invention, in order to limit transverse oscillations of the suspended load the connection means incorporate corresponding combined horizontal and vertical guides within which there slide corresponding pairs of terminal upper and lower bars from the systems of articulated bars, the terminal bars having a length which is similar to or only slightly less than that of the other bars in the pantograph structure. In this way, because each of the bars in such pairs of terminal bars is attached to the attachment means by means of two spaced apart pins the double bar structure has good lateral rigidity, greater than that of known devices. The guides for the pairs of upper terminal bars can be located side by side and on opposite sides of the cable lifting means so that the dimensions of the means remain contained within the elongatable structure even when the load is completely lifted and the bars in each system lie alongside each other, permitting upward travel of the suspended load which is independent of the presence of the lifting means.

In a preferred form of construction the cable lifting means comprise a motor-driven winch and the connecting means to the overlying structure comprise an upper plate below which the winch is rigidly fixed. This plate has side wings which are folded back at right angles towards the base of the opposite sides of the winch, these wings incorporating slots forming the guides in which the pairs of upper terminal bars slide.

The attachment means to the overlying structure may comprise at least one carriage equipped with at least two pairs of wheels, the pairs being spaced apart in the direction in which the carriage travels; these carriages, at least one of which may be motor-driven, are located above the plate and act to guide the device with minimum transverse play on a rail attached to the overlying structure. In this way the device and the suspended load can easily be moved horizontally along that rail, the at least two pairs of wheels spaced apart or the presence of several carriages spaced apart providing transverse rigidity against oscillations in the vertical plane passing through the rail.

The upper plate together with the corresponding side wings define an enclosure in which an electrical unit controlling the motor/reduction gear, the unit regulating the useful travel of the suspended load, and an overload and cable breakage monitoring unit can also be installed in addition to the motor/reduction gear of the winch.

In a preferred embodiment the connecting means to the suspended load located at the proximal end of the pantograph structure to the suspended load comprise a lower plate parallel to the upper plate having opposing lateral wings extending upwards at right angles in which are provided slots forming the sliding guides for corresponding pairs of lower terminal bars of the two pantograph systems. A bar which extends vertically upward, at the top end of which a rocker lever is pivoted at an intermediate point thereof to the ends of which are connected the ends of the two lifting cables operated by the winch, is attached to the center of the lower plate, at the top.

In a preferred embodiment the pivoting bar for the rocking lever extends upwards as far as is possible compatible with the available height within the device when this has all been gathered upwards. Also, in the double pantograph structure of the device, corresponding intermediate articulations between the bars in each pantograph are preferably applied to the corresponding ends of one horizontal pin which extends from one pantograph to the other, and two cable openings guiding the lifting cables of the device are attached to at least one of the pins. Both the pronounced upward development of the vertical pivot bar, which increases the mass of the part of the device suspended below the point of attachment of the lifting cables, and the presence of the cable openings for the lifting cables, effectively help to oppose lateral deformations in the attitude (namely the angular inclination of the structure with respect to some reference) of the device, in particular those due to possible differences between friction in the articulations of the pantograph.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a partial cross sectional view of the upper part of the device taken along line III—III in FIG. 2; and FIG. 4 is a partial perspective view of the device.

DESCRIPTION OF THE PREFERRED EMBODIMENT

Figure 1:
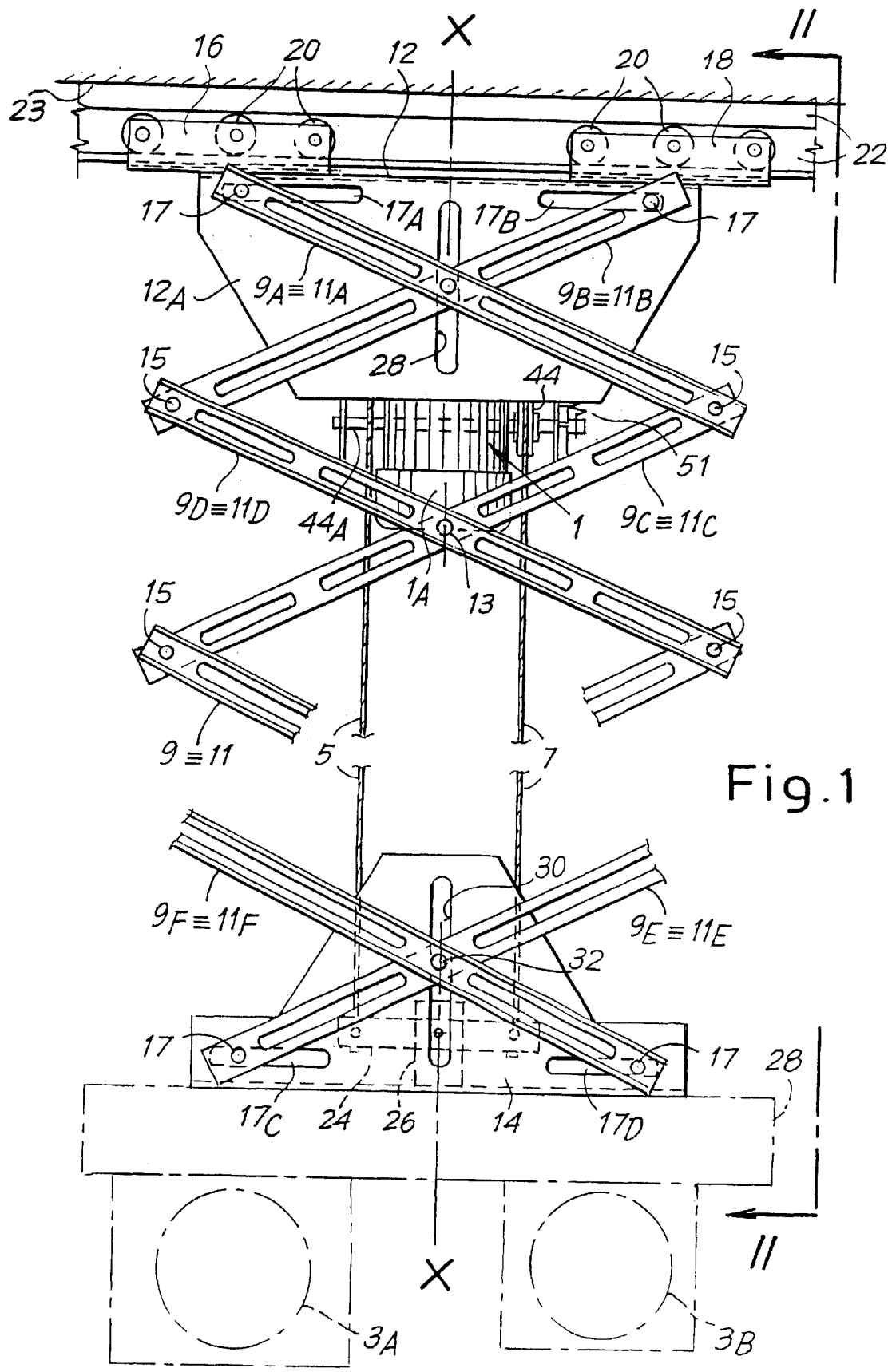
FIG. 1 is a diagrammatical side view of the whole of a device according to the invention with an applied suspended load, the load illustrated by an indicative line—in this case comprising a cross-member with two lighting units.

Referring to the drawings in particular, the device for suspending loads from an overlying structure, such as a ceiling or the like, especially for lighting equipment for photographic or television studios, comprises a winch 1 (FIG. 1) to adjust the height of the position of lighting equipment 3A, 3B by means of two lifting cables 5, 7 and two systems 9, 11 of bars articulated to form a pantograph which extend from an upper horizontal plate 12 with vertical side wings 12A, 12B which are bent downwards to a lower horizontal plate 14 with side wings 14A, 14B which are bent upwards. Above upper plate 12 are fixed two carriages 16, 18 fitted with pairs of wheels 20 which are capable of moving with minimum play along a rail 22 fixed to a ceiling 23. Lower plate 14 is suspended from cables 5, 7 of winch 1 by means of a rocker lever 24 which is pivoted at the center to a vertical bar 26 which is fixed to plate 14, cables 5, 7 being fixed to corresponding opposite ends of rocker lever 24. Lower plate 14 has fixing holes for the various systems for attachment to the suspended loads; for example in FIG. 1 a cross-member 28 to which lighting equipment 3A, 3B are fitted is fixed below plate 14.

Intermediate bars 9C, 9D; 11C, 11D of pantograph systems 9, 11 define articulated parallelograms arranged with two opposite apices corresponding to an intermediate pin 13 for the bars in vertical alignment 5 and with two opposite vertices corresponding to corresponding lateral pins 15 in horizontal alignment. Pins 15 are common to the two pantograph systems and with the bars of systems 9, 11 form a vertically extendible cage. End bars 9A, 913, 9E, 917; 11A, 11B, 11E, 11F (see also FIG. 3) are articulated at one end to a pin 15 and at the other end (which is of a length slightly less than that of the intermediate bars) by means of a pin 17 which can slide in a corresponding horizontal slot 17A, 1713; 17C, 17D. These slots are provided respectively in wings 12A, 1213; 14A, 14B of upper and lower plates 12; 14. Corresponding vertical slots 28; 30 within which corresponding pins 32 each fixed to a pair of outer bars 9A, 913; 11A, 11B; 9E, 9F; 11E, 11F of pantograph systems 9, 11 can slide are provided in wings 12A, 1213; 14A, 14B of upper plate 12 and lower plate 14 corresponding to the vertical sagittal plane of travel X—X of the device. In this way when the position of the suspended load is at any height each end bar is secured in the horizontal direction by pin 32 in vertical slot 28, 30 and in the vertical direction by pin 17 in corresponding horizontal slot 17A, 1713; 17C, 17D. Given the dimensions of the end bars, these points of attachment are spaced well apart and the rigidity of the device is not substantially influenced by the play with which the pins 17, 32 engage the corresponding slots. This configuration enables the device to support loads whose overall center of gravity is located outside the sagittal plane of travel X—X.

Figure 2:
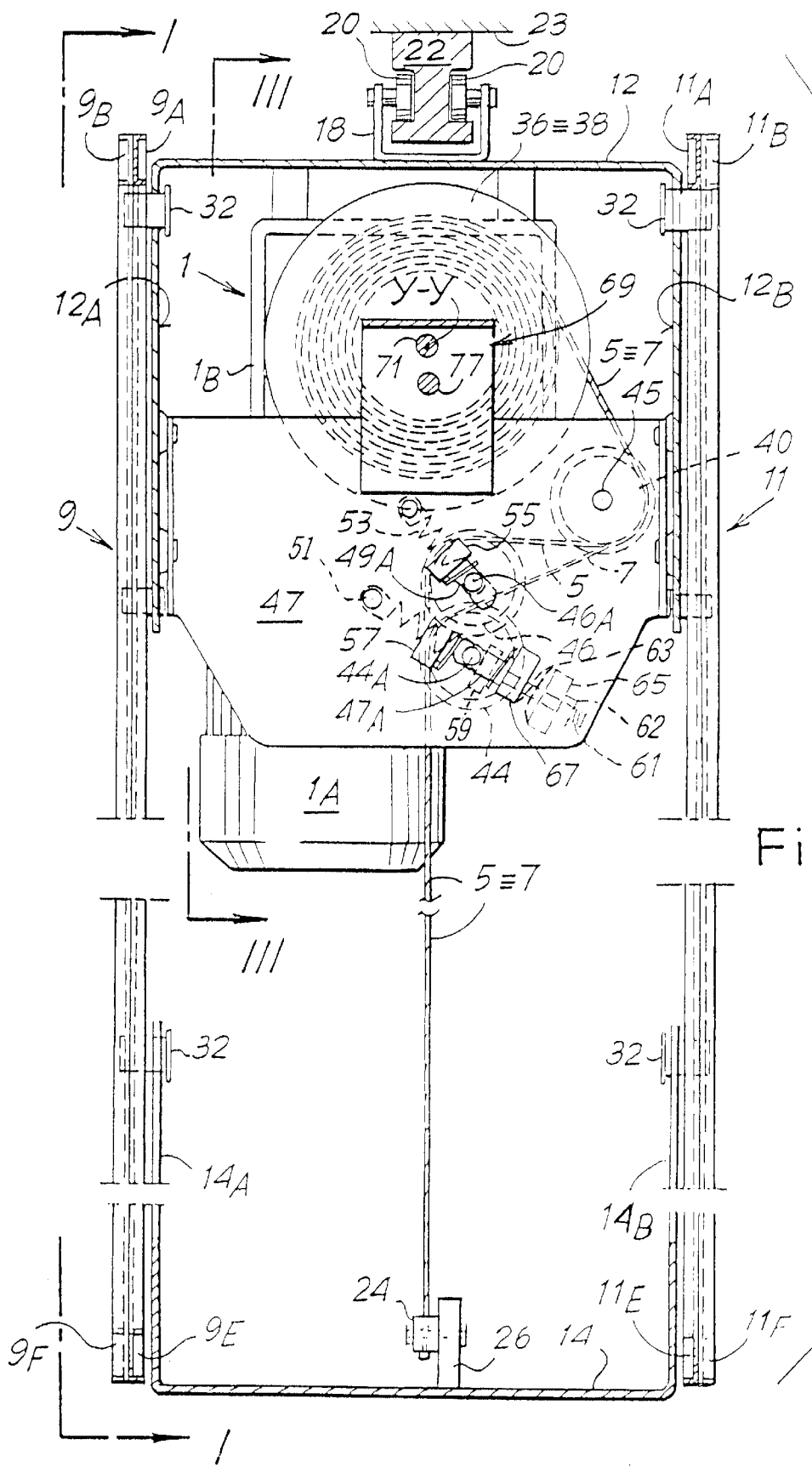
FIG. 2 is an enlarged side view of the device in FIG. 1 along II—II.

Winch 1 (see FIGS. 2 and 3) comprises an electric motor 1A and a motor/reduction gear 1 B located under upper plate 12. Output shaft 34 of axis Y—Y from motor/reduction gear 16 extends from both sides of the motor/reduction gear. Corresponding pulleys 36, 38, each of which comprises a pair of disks side by side between which one of lifting cables 5, 7 is wound into a spiral are keyed to shaft 34 on sides opposite the motor/reduction gear. The length of each cable 5, 7 leaving pulley 36, 38 is diverted by a corresponding first deviating idler pulley, 40, 42 turning on a shaft 45 and provided with a peripheral groove for the cable. Shaft 45 is supported by two plates 47, 49 located at the sides of the motor/reduction gear and fixed to wings 12A, 12B of plate 12. Each cable 5, 7 then passes into the throat of a second deviating idler pulley 44, 46 and partly wraps round it. These second pulleys 44, 46 are mounted on corresponding shafts 44A, 46A which are also supported by plates 47, 49; the support for shafts 44A, 46A which is proximal to corresponding pulley 44, 46 is formed of a slot 47A, 49A made in corresponding plates 47, 49, this slot being orientated along a line bisecting the angle of deviation of the corresponding cable around pulley 44, 46. A corresponding spring 51, 53 transversely presses corresponding shaft 44A, 46A towards the vertex of the diversion angle to operate a corresponding monitoring microswitch 55, 57 when cable 5, 7 breaks or slackens, in order to operate an alarm device. Slot 47A supporting shaft 44A is also extended on the other side with respect to the shaft, a shaft which is normally supported on the head 59 of a pin 61 and is stressed by a compression spring 63. This spring 63 is located between head 59 and a stirrup 65 fixed to plate 47 and preloaded by means of a nut 62 applied to the threaded terminal part of pin 61. In this way, when the load applied to the suspension device exceeds a predetermined limit shaft 44A slides in slot 47A overcoming the action of the compression spring 63 and operates another monitoring microswitch 67 which activates an alarm device.

A device 69, which is in itself known, is fitted to an extension of shaft 34 to limit the possible downward and upward travel of the suspended load. The device comprises a threaded shaft 71 which is coaxial with shaft 34 and is coupled to rotate together with it, an assembly 73 fitted with a threaded hole coupled to threaded shaft 71 to move along it as the shaft rotates and to bring about automatic interruption of the winch drive through end-of-travel microswitches 74, 75 when the predetermined travel limit for the load are reached. In particular the lower travel limit can be adjusted by moving microswitch 73 axially into a suitable position by means of a screw adjustment along shaft 77 parallel to shaft 71.

In an improved embodiment, for the reasons described above pivot bar 126 (FIG. 4) for rocker lever 24 extends as far as possible upwards compatible with the height available within the device when this is completely gathered upwards. In addition to this, the corresponding intermediate articulations 128 of the bars in each pantograph in the double pantograph structure of the device are preferably attached to the corresponding ends of the same horizontal pin 130 which extends from one pantograph to the other, and two wire openings 132 guiding lifting cables 5, 7 of the device are fitted to at least some of the pins 130.

While a specific embodiment of the invention has been shown and described in detail to illustrate the application of the principles of the invention, it will be understood that the invention may be embodied otherwise without departing from such principles.

I claim:

1. A device for suspending loads from an overlying structure, comprising:

means for permitting the position of the suspended loads to be adjusted for height;

an elongatable double pantograph articulated bar structure which is capable of limiting oscillations of said suspended loads;

device attaching means for attachment of the device to the overlying structure; and load attaching means for attachment of the device to the suspended loads located with respect to the opposite ends of said double pantograph structure, wherein corresponding combined horizontal guides and vertical guides are provided, in which corresponding pairs of upper terminal bars and lower terminal bars of said articulated bar structure slide respectively in said device attachment means and said load attachment means.

2. A device according to claim 1, wherein said means for permitting adjustment of the suspended loads for height comprises a winch and the horizontal guides and vertical guides for said pairs of upper terminal bars are located on opposite sides of the winch.

3. A device according to claim 2, wherein said device attachment means comprises an upper plate below which the winch is rigidly fixed, said upper plate having side wings on opposite sides of the winch which are bent downwards at right angles and in which are provided slots forming said horizontal guides and vertical guides in which the pairs of upper terminal bars slide.

4. A device according to claim 3, wherein said device attachment means comprises two carriages which are spaced apart and in line, attached to said upper plate and capable of guiding the device with minimum transverse play along a rail attached to said overlying structure.

5. A device according to claim 3, wherein the winch includes a motor/reduction gear and said upper plate with the side wings defines an enclosure within which an electric unit is provided controlling the motor/reduction gear, a unit regulating the useful travel of the suspended loads and devices monitoring overload and breakage of cables associated with the winch are also provided in addition to the winch.

6. A device according to claim 3, wherein said load attachment means is located at the end of the articulated bar structure proximal to the suspended loads and comprises a lower plate parallel to said upper plate and having opposing side wings extending upwards at right angles within which are provided slots forming said horizontal guides and vertical guides for the corresponding pairs of lower terminal bars of the articulated bar structure, and wherein said load attachment means includes attachments for said suspended loads provided below the lower plate.

7. A device according to claim 1, in which the lifting cables of the device are laterally guided by wire openings attached to pins where the ends of which are fitted into intermediate articulations of intermediate bars corresponding to each pantograph in the articulated bar structure.

8. A device according to claim 1, wherein a vertical pivot bar of the articulated bar structure extends upwards compatibly with height available within the device when the device is in a position where the device is all gathered upwards.

\* \* \* \* \*